(12) United States Patent
Zhou

(10) Patent No.: US 10,941,752 B2
(45) Date of Patent: Mar. 9, 2021

(54) VARIABLE-PITCH MULTI-SEGMENT ROTOR BLADE OF WIND TURBINE

(71) Applicant: Fang Zhou, Oviedo, FL (US)

(72) Inventor: Fang Zhou, Oviedo, FL (US)

( * ) Notice: Subject to any disclaimer, the term of this patent is extended or adjusted under 35 U.S.C. 154(b) by 139 days.

(21) Appl. No.: 16/300,939

(22) PCT Filed: May 13, 2016

(86) PCT No.: PCT/CN2016/081976
§ 371 (c)(1),
(2) Date: Nov. 12, 2018

(87) PCT Pub. No.: WO2017/193358
PCT Pub. Date: Nov. 16, 2017

(65) Prior Publication Data
US 2019/0285047 A1 Sep. 19, 2019

(51) Int. Cl.
*F03D 1/06* (2006.01)
*F03D 13/10* (2016.01)
*F03D 13/40* (2016.01)
*F03D 7/02* (2006.01)

(52) U.S. Cl.
CPC ............. *F03D 1/0675* (2013.01); *F03D 1/06* (2013.01); *F03D 13/10* (2016.05); *F03D 13/40* (2016.05); *F05B 2230/604* (2013.01); *F05B 2240/302* (2013.01); *F05D 2220/30* (2013.01); *Y02E 10/72* (2013.01); *Y02E 10/728* (2013.01)

(58) Field of Classification Search
CPC .... F03D 1/0641; F03D 1/0675; F03D 7/0224; F03D 7/0228; F03D 7/0252; F03D 7/0236; F03D 13/10; F03D 13/40; F03D 1/06; F05B 2230/604; F05B 2240/302; F05B 2260/74; F05B 2260/9011; F05D 2220/30; Y02E 10/721; Y02E 10/728; Y02E 10/723
See application file for complete search history.

(56) References Cited

U.S. PATENT DOCUMENTS 6,783,326 B2 * 8/2004 Weitkamp ............. F03D 7/0224
416/1

* cited by examiner

*Primary Examiner* — Michael Lebentritt
*Assistant Examiner* — Eric J Zamora Alvarez

(57) ABSTRACT

A variable-pitch multi-segment blade component comprises multiple blade segments and at least one variable-pitch guiding structure placed outside of the blade segments. The variable-pitch guiding structure comprises a guide rail fixed to one of the two adjacent blade segments and one or multiple guiding elements fixed to another one of the two adjacent blade segments, wherein the guiding elements are constructed to be guided and moved on the guide rail. The guiding element comprises multiple rolling elements. The variable-pitch guiding structure provides guiding and bearing type connection. The two adjacent blade segments are capable of rotating about a pitch axis of the blade segments.

19 Claims, 12 Drawing Sheets

S1–S6: airfoil of blade tip
S7: excessive airfoil
S8–S12: middle blade airfoil
S13: excessive airfoil
S14–S21: airfoil from middle blade to blade root

VARIABLE-PITCH MULTI-SEGMENT ROTOR BLADE OF WIND TURBINE

CROSS-REFERENCE TO RELATED APPLICATIONS

This application is a 35 U.S.C. 371 National Phase Entry Application from PCT/CN2016/081976, filed May 13, 2016. This application also claims the benefit of China Patent Application No. 201610318818.7 (CN), filed May 13, 2016.

FIELD OF THE INVENTION

The present invention relates to the field of wind turbine generator system, especially the field of multi-segment rotor blade for horizontal-axis wind turbine and blade manufacturing method. The present invention also relates to the rotors with this blade and rotor-based wind turbine, ocean current turbine as well as tidal turbine.

BACKGROUND OF THE INVENTION

As a kind of clean and renewable energy, wind energy has developed rapidly in recent years. To compete with conventional energy sources (such as coal, petroleum, natural gas, large and medium-size hydropower), it is important for the clean and renewable energy to reduce costs and improve its operating efficiency. The unit cost of wind turbine reduces with the increase of single-unit power. Large-scale horizontal-axis wind turbines have a cost advantage in terms of manufacturing, installation and operation. Nowadays, the wind turbine around the world shows a developing trend towards large power and long blades.

For large blades, weight and stiffness of the blade has become a major problem. It has become an urgent problem in the wind power development to improve the strength and stiffness and reduce the weight of the large blade at the same time to lower the cost.

It's hard to transport a large blade. This has increasingly become a bottleneck constraining the development of wind power. As a result, long-distance transport of even larger wind turbine blade in full scale is likely to be more difficult in the future.

The blades of horizontal-axis wind turbine rotate about the horizontal axis. The linear velocity on different sections along the bland longitudinal direction is different, the fastest at the blade tip and slowest near the blade root. Under the same wind speed, the angle between relative wind speed and rotor plane at the blade tip is the smallest, which is the largest at the blade root. To enable all segments of blade to operate at optimal attack angle, usually the blades are manufactured as twist type. Generally, the twist angle from root to tip is 10°-20°. As shown in FIG. 1a and FIG. 1b, both figures show the changes in airfoil chord length and twist diagram of an exemplary blade. Wherein FIG. 1a generally shows a side view of blade, and FIG. 1b shows the multiple cross-sectional views along the blade longitudinal axis and the cutting plane basically vertical with the blade longitudinal axis. These cross-sectional positions are different along the longitudinal direction of the blade, such as a blade tip part, blade middle part and blade root part. S1-S6 show the airfoil at blade tip part; S7 shows the airfoil of transition part between blade tip part and blade middle part; S8-S12 show the airfoil of blade middle part; S13 shows the airfoil of transition part between blade middle part and blade root; S14-S21 show the airfoil from blade middle part to the blade root, so that the different twist angle at different longitudinal positions of the blade is shown.

Currently, the variable-pitch control technique is used for the large horizontal-axis wind turbine. Generally, the pitch angle refers to the angle between airfoil chord line at blade tip and the rotation plane of wind turbine rotor. In case of extreme wind speed, the whole blade can be rotated as trying to adjust it into downwind state. The chord lines in main blade segments are parallel with wind direction, which is called the full feathering state. At the moment, the windward area of blade is the smallest and the wind action exerted on blade and wind turbine is greatly reduced. However, under current technology, the blades are usually made with a twist angle so as to make a maximum twist angle near to blade root. Under such condition, it is impossible for large blade with variable-pitch control to enable all the blade cross section chord lines to be in full feathering state which is parallel with wind direction (positive pitch angle is 90 degree) and it is possible that the part of blade and wind turbine still bear relatively large load.

In addition, under current technology, the blade twist angle at each cross section position of blade is generally calculated and obtained according to optimum angle of attack of blade under rated wind speed. When wind speed is not at rated wind speed, adjust the blade pitch angle for the whole blade to increase or decrease a unified blade pitch angle to each blade longitudinal cross-section of blade, however it is difficult to obtain the optimal angle of attack on each cross section position.

There are existing technologies proposing the variable-pitch control method for segmentation of wind turbine blades.

The China patent with the publication No. CN102628423B relates to a partially variable pitch wind turbine of blade and the method for control on the partially variable-pitch wind turbine blade under extreme wind conditions. The wind turbine blade consists of first blade segment and second blade segment. And the second blade segment can be rotated relative to the first blade segment. Preferably, the first blade segment may be the blade segment with stall control which means that it shall be fixed; the second blade segment possesses pitch control. Under extreme wind conditions, the second blade segment is rotated to the feathering position first, then position and lock the second blade segment is rotated and locked with approximately orthogonal pitch angle relative to the first blade segment so as to reduce the extreme loads. The surface area of the first blade segment mentioned above is approximately equal to that of the second blade segment mentioned above, which enables the force generated on the second blade segment by the head-on wind approximately equal to that generated on the first blade segment mentioned above, but the two forces are orthogonal on the directions so as to minimize the composed force vector exerted on wind turbine structure.

In the wind turbine, No. CN102628423B mentioned above, only the pitch angle of second blade can be changed during normal operation, which cannot effectively optimize the operating efficiency of wind power. In addition, even though the surface areas of first and second blade segments are the same, it cannot guarantee the forces generated on the two blade segments to be approximately the same. However, even though the first and second blade segments are approximately orthogonal, it still cannot guarantee the forces generated on them to be approximately orthogonal; thereby, the composed force vector exerted on wind turbine structure may not be minimized.

In addition, in the blades of above CN102628423B wind turbine, the interface between first and second blade segments becomes the weak cross section of the whole blade due to installation of variable pitch system. Two blade segments are not connected with reinforcing device which makes it hard to meet the requirements on strength and stiffness for withstanding the extreme loads.

The US patent with the application publication No. 2009/0148285 and 2009/0148291 involve the multi-blade type of wind turbine with partially variable pitch which is equipped with hub extension piece and rectifying device. Under extreme wind segment conditions, the blade pitch of external blade side is changed into feathering position which is kept fixed by the internal blade part of rectifying device.

For the wind turbine based on the proprietary technology of above US patent with the application publication No. 2009/0148285 and 2009/0148291, because the internal blade part is kept fixed, the blade pitch of this blade segment can not be changed to feathering position which can not minimize the loads on the whole blade under extreme wind conditions. In addition, the blade only relies on the connection with pitch-controlled system but is not connected with reinforcing devices, which makes it hard to meet the requirements on strength and stiffness to withstand the extreme loads.

Therefore, it is hoped to provide the multi-segment blade with high strength and stiffness which is capable of efficiently changing blade pitch.

SUMMARY OF THE INVENTION

The object of the present invention is to provide a multi-segment blade with variable pitch.

In accordance with one embodiment of the present invention, a blade component with variable pitch angle is provided, including: blade with multiple blade segments, least two adjacent blade segments rotatable relative to each other to change the pitch angle; and the variable-pitch guiding structure which includes the circumferential extension guide rail that can be fixed to one of the two adjacent rotatable blade segments, and another one or multiple guiding elements that can be configured to the two adjacent rotatable blade segments, wherein said one or multiple guiding elements are constructed to be guided and moved on said guide rail.

Relying on the variable-pitch guiding structure equipped externally can realize the efficient blade pitch change among blade segments.

In addition, the equipped variable-pitch guiding structure also provides the possibility as other functional elements. In another embodiment of the present invention, at least one variable-pitch guiding structure is constructed into the connecting structure which can be used for bearing the connection between two adjacent blade segments, without affecting the relative rotation between the two blade segments. In other words, according to one embodiment of the present invention provides at least one connecting bracket, which is fixed to the blade and crossing a certain distance through longitudinally along the blade. And it can be used as variable-pitch guiding structure based on the embodiment of the present invention. In the embodiment of present invention, such guiding and bearing dual-function structure can not only beneficially provide efficient blade pitch change, but also can reduce or eliminate the weak bearing condition at the interface of blade segments caused by setting of the function of blade pitch change.

According to an embodiment of the present invention, the blade components also consist of a variable-pitch actuating mechanism at the interface between at least two adjacent blade segments.

According to an embodiment of the present invention, said variable-pitch actuating mechanism also consists of the variable-pitch driver and bearing equipped inside the blades.

According to an embodiment, said variable-pitch guiding structure comprises multiple guiding elements equipped based on circumferential intervals.

According to an embodiment, said guiding elements comprise the rolling elements rolling along the said guide rail and/or the sliding element sliding along the said guide rail.

According to an embodiment, each of said guiding elements comprises a pair of rolling elements rolling along the top and bottom surface of said guide rail. Relying on this pair of rolling elements can not only provides the rolling of rolling elements along guide rail on circumferential direction but also provides the restriction on the rolling elements for longitudinal motion along blade. It provides the bearing-type connection between two blade segments.

According to an embodiment, said rolling elements comprise rolling bearings.

According to an embodiment, said variable-pitch guiding structure also comprises the first leg used to fixedly connect the guide rail to the blades and the second leg used to fixedly connect said guiding member to the blades.

According to an embodiment, said variable-pitch guiding structure also comprises the connecting members that can span a certain distance through longitudinally along the blade the first end of said connecting member is fixed to the second leg and the second end is equipped with the said guiding members.

According to an embodiment, said guide rail presents ring-shaped circumferentially surrounding said blade. According to another embodiment, one or multiple guide rails may be equipped.

Preferably, at least part or preferably all of said variable-pitch guiding structure can be made of high-strength, high-modulus and low-density materials such as carbon fiber composite, etc. This can reduce weight and provide high strength and stiffness of blades.

According to an embodiment, said blade components also comprise at least one blade reinforcing member, of which said blade reinforcing member may be constructed as the form with at least one end connecting to said variable-pitch guiding structure. The variable-pitch guiding structure and the blade reinforcing member not only improve the stiffness of this blade segment, but also increases the stiffness of the whole blade.

According to an embodiment, said variable-pitch actuating mechanism is equipped at the exterior of blade.

Another scheme of the present invention provides a variable pitch blade component, including: multiple blade segments which least two adjacent blade segments rotatable relative to each other to change its pitch angle; and the multiple connecting bracket which are fixed to the blade and spans a certain distance through longitudinally along blades; of which at least one of the connecting brackets is constructed to be used as the variable-pitch guiding structure fixed to the two adjacent blade segments rotatable relative to each other; and the variable-pitch guiding structure also comprises at least one first leg fixed to one of the two adjacent blade segments, at least one second leg fixed to another one of the adjacent blade segments, the circumferential guide rail fixed to first leg and at least one connecting element fixed to second leg; one end of said connecting element is fixed to the second leg and another end is equipped with the rolling elements connecting with the guide rail in rolling joint form.

In the embodiment according to the present invention, the variable-pitch guiding structure with dual functions including guiding and load bearing may not only beneficially provide efficient blade pitch change, but also reduce or remove the condition with weak bearing at the bonding interface of blade segments caused by setting of variable pitch function.

Preferably, said connecting bracket and/or the variable-pitch guiding structure are made of high-strength, high-modulus and low-density materials, such as carbon fiber, etc. This reduces weight and provide high strength and stiffness of blades.

According to an embodiment, the said blade components comprise at least one reinforcing member, of which said blade reinforcing member is constructed as the form with at least one end connected to said connecting bracket so as to separate with said blade. Preferably, said blade reinforcing member is made of high-strength, high-modulus and low-density materials, e.g. carbon fiber. This can reduce weight and provide high strength and stiffness of blades.

According to an embodiment, said blade components also comprise at least one first blade reinforcing member on the first side of blade and at least one second blade reinforcing member on the opposite side which is the second side of blade, of which said first and second blade reinforcing members are constructed as the form with at least one end connected to said variable-pitch guide structure.

According to an embodiment, said first and second blade reinforcing members are roughly symmetrically set around the blades.

According to the preferential embodiment, said blade comprises blade root segment, one or multiple middle blade segments and blade tip segment. Preferably, said blade components consist of first connecting bracket and second connecting bracket used as variable-pitch guiding structure. The first connecting bracket bridges blade root segment and middle blade segment along blade lengthwise direction while the second connecting bracket bridges the middle blade segment and blade tip segment along lengthwise direction. More preferably, it also consists of the third connecting bracket equipped on the end (e.g. blade root) in blade root segment away from the middle blade segment.

Preferably, one or multiple blade reinforcing members are connected with first and second connecting brackets, and/or one or multiple blade reinforcing members are connected with second bracket on one end while the other end is connected to the blade tip segment, for example, the middle position of blade tip segment; and/or one or multiple blade reinforcing members are connected with first connecting bracket on one end while the other end is connected to third bracket or directly connected to the middle blade root segment, for instance, the end in blade root segment away from middle blade segment.

Another scheme of the present invention provides a rotor which consists hub and multiple blade components connected to said hub based on the embodiment of the present invention; The said blade components include blade root segment. Preferably, the blades comprise or consist of blade root segment, middle blade segment and blade tip segment.

Another scheme of the present invention provides a wind power system comprising a rotor according to the present invention.

Another scheme of the present invention provides a power generating equipment comprising rotor according to the embodiment of the present invention; said power generating equipment includes wind turbine, ocean current turbine and tidal turbine.

Another scheme of the present invention provides the variable-pitch device between blade segments, including variable-pitch actuating mechanism and variable-pitch guiding structure.

Another scheme of the present invention provides a manufacturing method for blade component or rotor with such blade components.

Another scheme of the present invention provides a method of control for pitch angle of blade.

Part of other characteristics and advantages of the present invention is obvious for the technician in this field who reads the present application. The other part is described in conjunction with the accompanying drawings in the following detailed description.

BRIEF DESCRIPTION OF THE DRAWINGS

The following detailed description of embodiments of the present invention seen in relationship with attached drawings, will give a more comprehensive understanding of the present invention.

FIG. 9a and FIG. 9b present the partial enlarged drawings of FIG. 9.

Figure 1A:
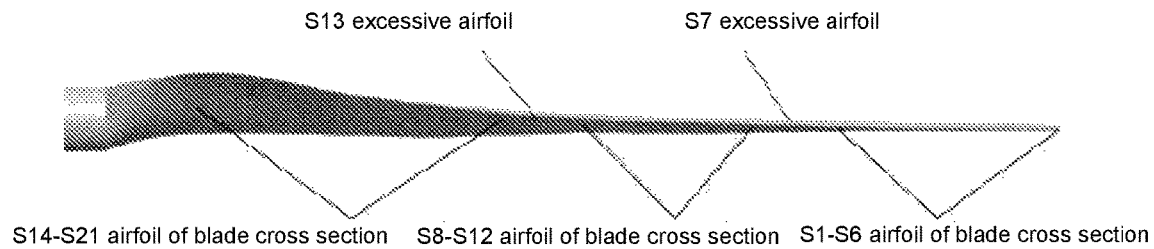
FIG. 1a and FIG. 1b are the exemplary diagrams of airfoil chord length and twist angle changes of an blade.

The same or similar drawing marks in the present invention indicates same or similar members/elements or characteristics.

DETAILED DESCRIPTION OF THE PREFERRED EMBODIMENT

This is hereby to describe the specific embodiments of the present invention by referring to the drawings for a more comprehensive understanding of the technical characteristics, purposes and effects of the present invention. Although the drawings are provided to present embodiments of the invention, their sizes are not necessarily drawn as the particular embodiments, certain features may be exaggerated or sectioned to better illustrate the present invention. The phrase appears "in the drawings" or similar terms in the specification are not necessary to refer to all the drawings or examples.

Directional terms used for describing the drawings, such as "upper", "lower", "left", "right", "upwards", "downwards" and other terms shall be understood to have its normal meaning when reading the accompanying drawings, which shall not be construed as specific limitation to the technical proposal of the appended claims.

The term "about" or "approximately" herein will be understood by the general technicians and vary within certain range according to its context.

The embodiment of multi-segments and/or reinforced blade component applied in wind rotor based on the present invention is hereby described by referring to the figures. The blade component is applied in wind rotor, e.g. horizontal-axis wind turbine and preferred large-scale horizontal-axis wind turbine in accordance with the present invention embodiments. However, it can be inferred that the blade component based on the present invention can be applied in any applicable occasion which applies blades, e.g. other types of wind turbine, ocean current turbine and tidal current turbine.

Even though not indicated, the embodiment of wind turbine includes a rotor and a generator. The rotor contains hub 6 and multiple blades. Preferably, said multiple blades are uniformly arranged in circumference direction around the hub. According to the embodiment of the present invention, at least or preferably all of the multiple blades are constructed as blade component 10 of the embodiment of the present invention, of which the blade component is sectional type and has multiple blade segments; and at least the two adjacent blade segments may rotate relative to each other to change its pitch angle of blade segment. The blade component of the embodiment based on the present invention may also rotate about blade longitudinal axis relative to hub, for instance, the whole blade is variable-pitch. In an embodiment, there is equipped with the variable-pitch actuating mechanism at blade root used to enable the blade root segment or whole blades rotate about the blade longitudinal axis relative to the hub.

According to an embodiment, one or multiple or preferably all the blade segments of blade component based on the present invention may not only rotate relative to the hub, but also may rotate relative to other blade segments; so that the whole blade components of this embodiment may change pitch angle relative to the hub and may also change pitch angle between the blade segments. According to an embodiment of the present invention, the blade components may include variable pitch device between blade segments, which include variable-pitch actuating mechanism and variable-pitch guiding structure. These will be described below.

According to an embodiment of the present invention, the blade component may include at least one connecting bracket for connecting two blade segments, which will be described below. According to an embodiment of the present invention, at least one of variable-pitch guiding structure between blade segments of the blade component is constructed as connection structure or vice versa. In other words, according to the embodiment of the present invention, the dual-function structure with the connecting bracket used for connecting the two blade segments and the variable-pitch guiding structure used for guiding the mutual rotation of two adjacent blade segments is provided. However, it can be figured out that in the other embodiments according to the present invention, part or all of the connecting brackets and/or variable-pitch guiding structures between blade segments may only possess single function such as only using as variable-pitch guiding or only using as bearing connecting.

As is known and not indicated, the wind turbine may also include the cabin used for rotationally supporting rotor and the tower used for supporting said cabin. Preferably, the cabin can rotationally support the hub or rotating shaft (not indicated), so that the rotation of rotor is able to generate power through the drive mechanism contained in the cabin. In the present invention, the structures of cabin and tower are not crucial and therefore will not be described in details. In addition, the blade components and rotors according to the present invention may also be correspondingly applied to other wind turbine, such as those without cabin and/or tower.

The schematic embodiment of blade 100 according to the present invention is described below in details.

Figure 2:
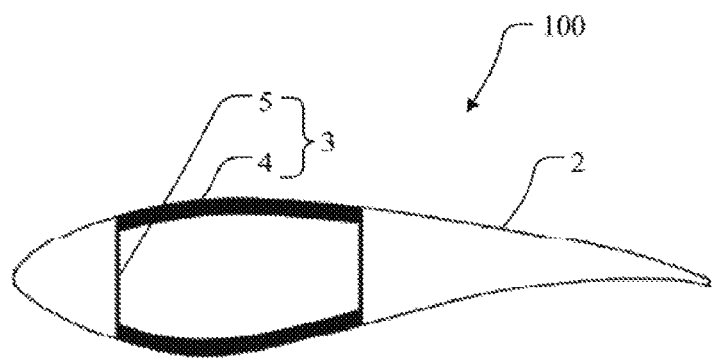
FIG. 2 presents cross-sectional view of an exemplary blade.

Blade 100 according to the embodiment of the present invention may be in the structure as shown in FIG. 2, including blade shell 2 and the beam structure 3 covered by blade shell 2. As previously mentioned, in the indicated embodiment, the beam structure 3 may comprise a pair of main beam 4 and shear web 5; the blades such as blade shell 2 and beam structure 3 in the indicated embodiment may be made of glass fiber composite material. The technicians of this field will understand that the blades according to embodiment of the present invention can use different blade structures, materials and shapes. For example, it can use different beam structures and blade airfoil profile. Further example, the blade shell and beam structure are made of different materials, or the material of blade shell is different from that of beam structure. Each blade segment in the embodiment according to the present invention may possess their respective beam structures and blade shells. It can be figured out that only a part of blade segment has beam structure, which also falls into the scope of the present invention.

Figure 3:
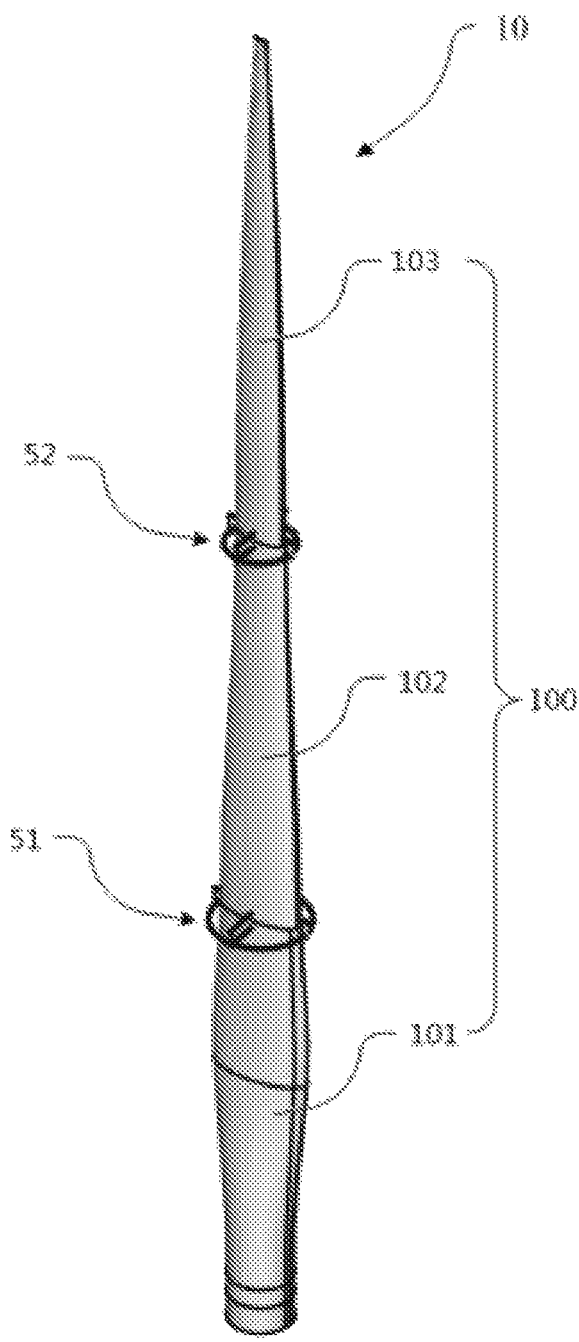
FIG. 3 shows the space diagram of blade component of an embodiment according to the present invention.

FIG. 3 presents the blade 100 with blade component 10 in the embodiment of the present invention. Blade 100 may comprise multiple blade segments. It comprises three blade segments in the indicated embodiment, i.e., the first blade segment or blade root segment 101, second blade segment or middle blade segment 102 and the third blade segment or blade tip 103. The technicians of this field will understand that blade 100 may comprise more or less than three blade segments which falls into the scope of the present invention. For instance, in an embodiment, the blade comprises blade root segment, blade tip and more than one middle blade segments. In another embodiment, the blade only comprises the blade root segment and blade tip.

As shown in FIG. 3, in the indicated embodiment, the blade component 10 comprises multiple variable-pitch guiding structures between blade segments. The indicated embodiment also comprises two variable-pitch guiding structures 51 and 52. In the indicated embodiment, said variable-pitch guiding structures 51 and 52 may also be constructed as the connecting bracket used for supporting connection of adjacent blade segments. For example, in the embodiment indicated in FIG. 3, the variable-pitch guiding structure 51 may be constructed as the first connecting bracket while the variable-pitch guiding structure 52 may be constructed as the second connecting bracket. Therefore, this embodiment and other embodiments below may mix the use of terms such as "variable-pitch guiding structure" and "connecting bracket" for the device which possess both functions of guiding and connecting. However, it can be figured out that, there may be provided one or multiple variable-pitch guiding structures with no connecting such as supported connecting and/or the connecting brackets with no guiding function, e.g. the connecting bracket 11 as described below. Any of their practicable combinations will fall into the scope of the present invention.

In the embodiment shown, the variable-pitch guiding structures (connecting brackets) 51 and 52 may span certain distance through longitudinal extension, so as to bridge the adjacent blade segments of blade 100. Specifically, the variable-pitch guiding structure 51 is connected with blade segment (blade root segment) 101 and blade segment (middle blade segment) 102; the variable-pitch guiding structure 52 is connected with blade segment (middle blade segment) 102 and blade segment (blade tip) 103. In the embodiment shown, each pair of adjacent blade segments are equipped with variable-pitch guiding structures. However, it should be known that the blade components can comprise more or less variable-pitch guiding structures.

The variable-pitch guiding structures 51 and 52 may comprise the guide rail extended along circumferential direction, while ring rail and the guiding element guided along this guide rail are preferred.

The said variable-pitch guiding structure (connecting bracket) may have multiple kinds of shapes and/or structures and may still realize the pitch angle change and/or supporting connection of guiding blade segments.

A specific embodiment of variable-pitch guiding structure will be described below in details.

Figure 4:
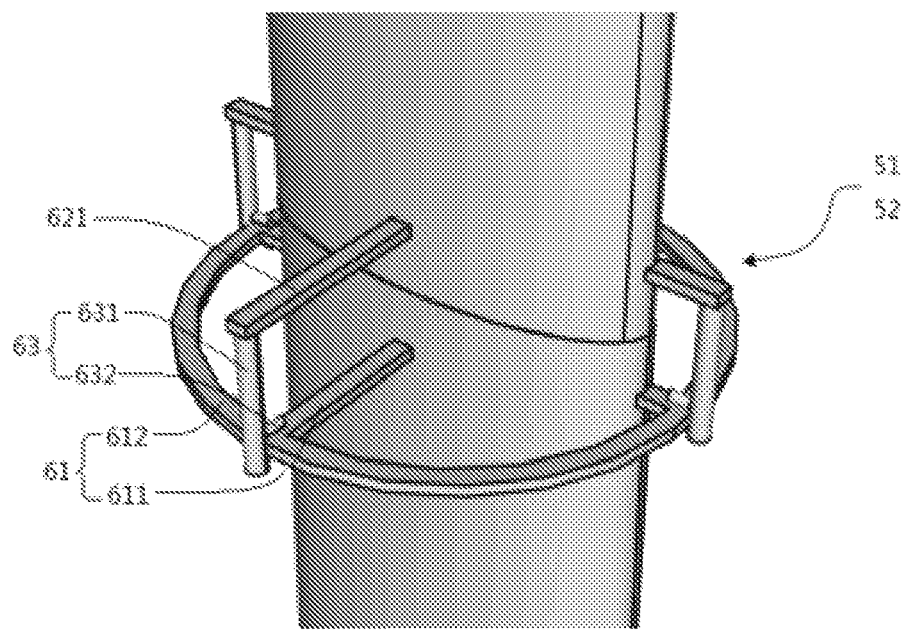
FIG. 4 is the partial enlarged drawing of blade component in FIG. 3 and presents the connecting bracket between blade segments.

FIG. 4 presents the embodiment of variable-pitch guiding structures 51 and 52 according to the present invention. The variable-pitch guiding structures 51 and 52 may comprise the first supporting portion 61 fixed to one of said two adjacent blade segments, multiple second supporting portion 62 fixed to the other of said two adjacent blade segments, and the connecting portion 63 connected the first and second supporting portions.

In the embodiment shown, said first supporting portion 61 may comprise the first leg 611 extended from blade in radial direction and the guide rail 612, here as circular guide rail, extended in circumferential direction fixed to the first leg. The first supporting portion 61 may also comprise the reinforcing supporting element which may be needed (not indicated). In the embodiment shown, there is equipped with four first legs 611, e.g. the two pairs of first legs set up in radial direction. The interval between each preferential first leg is about 90°.

In the embodiment shown, the second supporting portion 62 may comprise the second leg 621 extended from blade in radial direction and the reinforcing supporting element which may be needed (not indicated). In the embodiment shown, there is equipped with four second legs 621, for example, two pairs of second legs respectively set up in radial direction. The interval between each preferential second leg is about 90 degrees.

In the embodiment shown, the connecting portion 63 comprises the connecting element 631 spanning a certain distance along blade in length wise direction and guiding element 632 (such as rolling element and/or sliding element, rolling bearing). The first end of the said connecting element is fixed to the second supporting portion 62 or the second leg 621, and the second end is equipped with the said guiding element 632 (e.g. the rolling element of rolling joint guide rail). In the embodiment shown, there may be correspondingly equipped with four connecting portion 63, for instance, two pairs of connecting portions respectively set up in radial direction which are connected to their respective second legs 621.

In the embodiment shown, there is equipped with a pair of guiding elements 632 respectively guided along the top surface and bottom of said guide rail. This pair of guiding elements clamp said guide rail so as to restrain the relative displacement and/or transmission of the two blade segments on length wise direction and bearing of longitudinal loads. The guiding element 632 may present the form of rolling bearing. Although not indicated, the rolling bearing may have inner bearing part, outer bearing part and the rolling part between the inner and outer bearing parts, e.g. balls.

Relying on the guiding element 632 and guide rail 612, the adjacent blade segments are rotatably connected and are able to withstand the loads. Relay on the guiding element 632 is firmly connected to the guide rail and capable of moving along guiding rail (such as rolling and/or sliding), which can realize not only the connection between segments, but also independent rotation of blade segment or the variable-pitch rotation of one blade segment relative to another blade segment. In the embodiment shown, the first and/or second support portion and/or connection portion or its components, such as guide rail 612, guiding element, first leg, second leg and connecting element, may be arranged by taking the longitudinal rotation axis or the variable-pitch rotation axis of blade as the axis center, and the blade segment may rotate with variable pitch by taking this axis as axis center. Although the indicated embodiment, as previously mentioned, indicates the variable-pitch guide structure with guiding and bearing connection, people may figure it out that the variable-pitch guiding structure with guiding function is provided in the indicated embodiment, and that the structure is independent from this variable-pitch guiding structure used for bearing connection, for example, the connecting bracket independent with the guide structure.

With continued reference to FIG. 4, in the preferential embodiment shown, the variable-pitch guiding structure (connecting bracket) may be in frame shape, and the preferably both first leg and/or second leg and/or connecting portion may be in beam frame structure. For example, the overall frame structure and the connecting element shape of variable-pitch guiding structure can help to reduce the aerodynamic impacts on blades, so as to reduce the wind drag. However, the technicians of this field will understand that the variable-pitch guiding structure may present other kinds of structures or frames.

Figure 5:
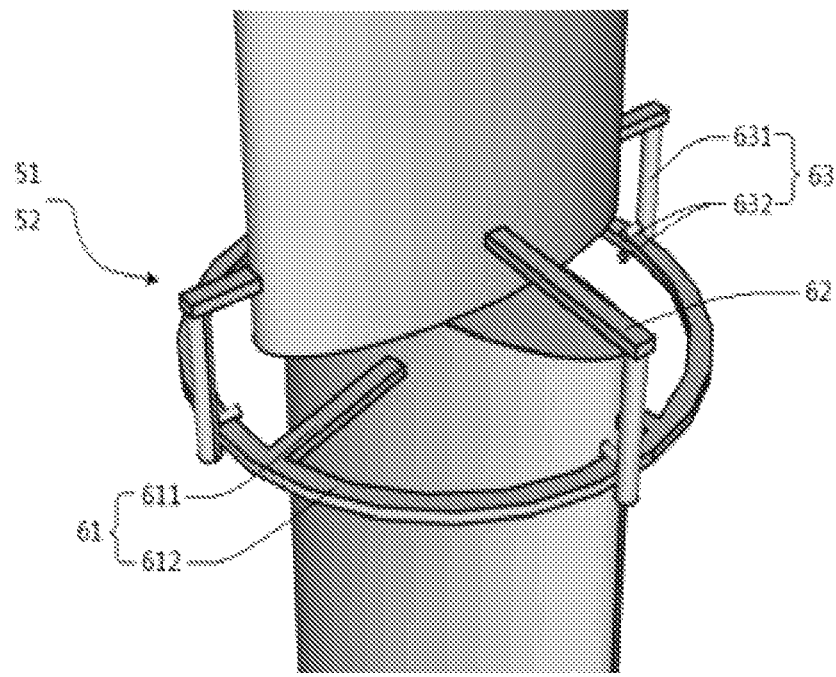
FIG. 5 is the partial enlarged drawing of blade component in FIG. 3 and presents the connection that connecting brackets between blade segments as well as the variable pitch rotation of two blade segments.
Figure 13A:
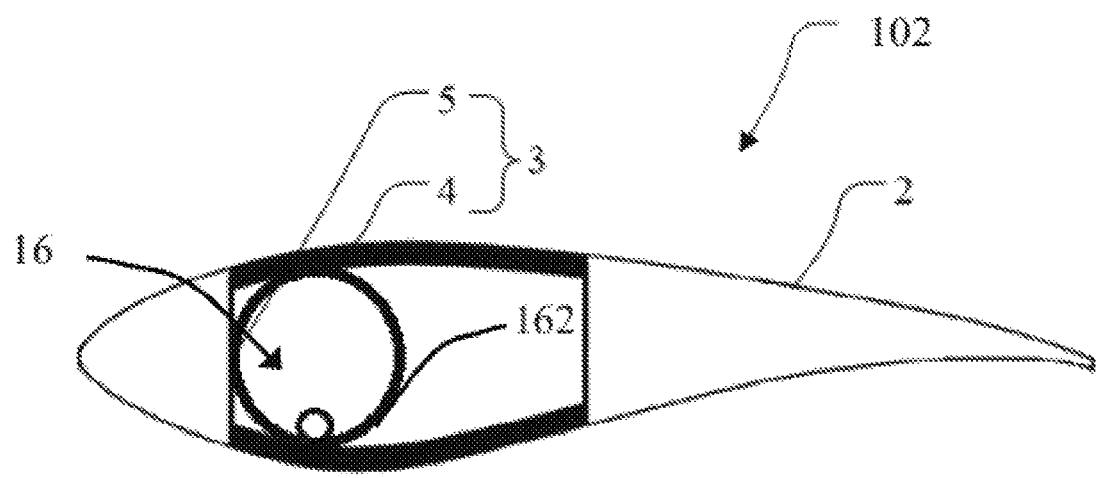
FIG. 13a and FIG. 13b present the diagrams of variable-pitch actuating mechanism of blade segment on the interface between blade segments and equipped inside blade.
Figure 13B:
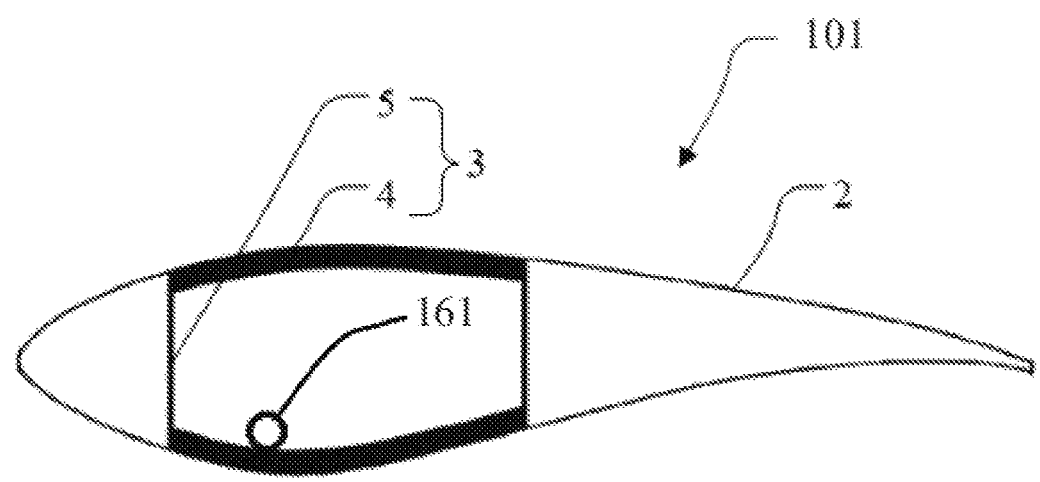

FIG. 5 presents the partial enlarged drawing of variable-pitch guiding structure of blade according to the embodiment of the present invention. It shows the connection between blade segment and variable-pitch guiding structure of blade, and the variable-pitch rotation of one blade segment relative to another blade segment. The blade 100 as a whole in the embodiment of the present invention may make variable-pitch angle rotation under the driving of variable-pitch actuating mechanism at the joint between hub and blade root. In addition, the adjacent blade segments may also mutually make variable-pitch rotation. In this embodiment, the variable-pitch actuating mechanism of blade segment is located inside the blade and the interface between blade segments. FIG. 13a and FIG. 13b present the variable-pitch actuating mechanism 16 is located the interface between the first blade segment (blade root segment 101) and second blade segment (middle blade segment 102). In the embodiment shown in FIG. 13a and FIG. 13b, such variable-pitch actuating mechanism 16 comprises only schematic drawing of variable-pitch drive motor 161 and variable-pitch bearing 162. Variable-pitch bearing 162 can be arranged by taking the longitudinal rotation axis or variable-pitch rotation axis of blade as axis center. In the indicated embodiment, the variable-pitch drive motor 161 is installed in the blade root segment 101, while the variable-pitch bearing 162 is installed in the middle blade segment 102. Besides, the variable-pitch drive motor 161 is extended from blade root segment 101 to the middle blade segment 102 so as to engage with the variable-pitch bearing 162. Although the schematic variable-pitch actuating mechanism is indicated, the technicians of this field may figure it out that the different structures and setting locations of variable-pitch actuating mechanism, including but not limited to: reverse setting of variable-pitch drive motor 161 and variable-pitch bearing 162; the variable-pitch actuating mechanism is equipped in other blade segments; the replacement of drive motor or other drivers for supplementary application (such as motor, hydraulic motor); the variable-pitch actuating mechanism or its components are equipped at other locations relative to the blade segments like the exterior of blade segments; there is equipped with multiple variable-pitch actuating mechanism and any feasible combinations of above characteristics.

Figure 1B:
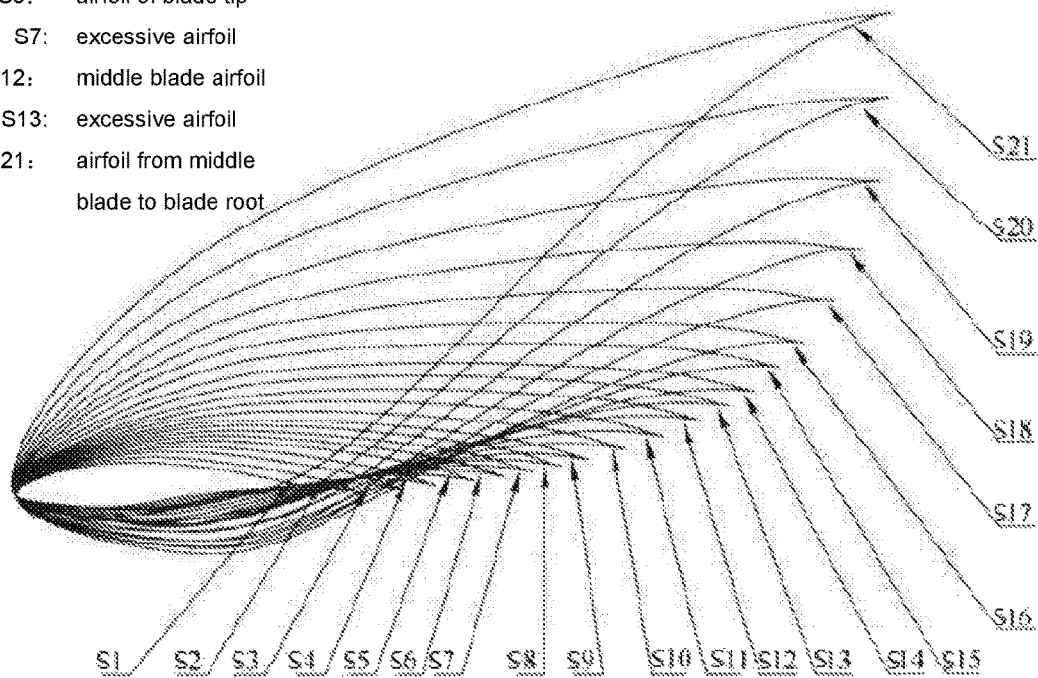

In the indicated embodiment, the blades may have different twist angle of blades along its longitudinal axis like the embodiment as shown in FIG. 1a and FIG. 1b. However, the technicians of this field may come up with other blade twist configurations which are different from that in FIG. 1a and FIG. 1b. Although not limited by theory, in some embodiments, in order to keep the optimal geometric attack angle of blades, the blades of each blade segment shall have different blade twist angle at different locations along the length wise direction. For instance, to keep the various locations of blade have optimal attack angle during operation under given wind speed (generally being rated wind speed), the blades are generally made with installation twist angle so that the twist angle will be maximum near the blade root and minimum at the blade tip. According to an exemplary embodiment, for the wind turbine with radius of about 40 meters, calculate its optimal value as per the optimal operation wind speed of 8 m/s and its twist angles at locations with different radius will respectively be 0°-16° from blade tip to the location near to blade root. Generally, the pitch angle refers to the inclined angle between blade tip airfoil chord line and rotation plane of wind rotor. Therefore, the current techniques lack of variable pitch adjustment for blade segments, cannot keep the inclined angle between airfoil chord line and rotation plane of wind rotor of all blades at the feathering state with positive pitch angle of 90°. In the context of the present invention, unless otherwise indicated, the pitch angle may refer to the inclined angle between airfoil chord line and rotation plane of wind rotor. For example, the pitch angle aiming at various blade segments may refer to the inclined angle between airfoil chord line at middle position of this blade segment and rotation plane of wind rotor. However, it may be figured out that the pitch angle of each blade segment may adopt the inclined angle between the airfoil chord line at other reference positions in the blade segment and the rotation plane of wind rotor.

Figure 6:
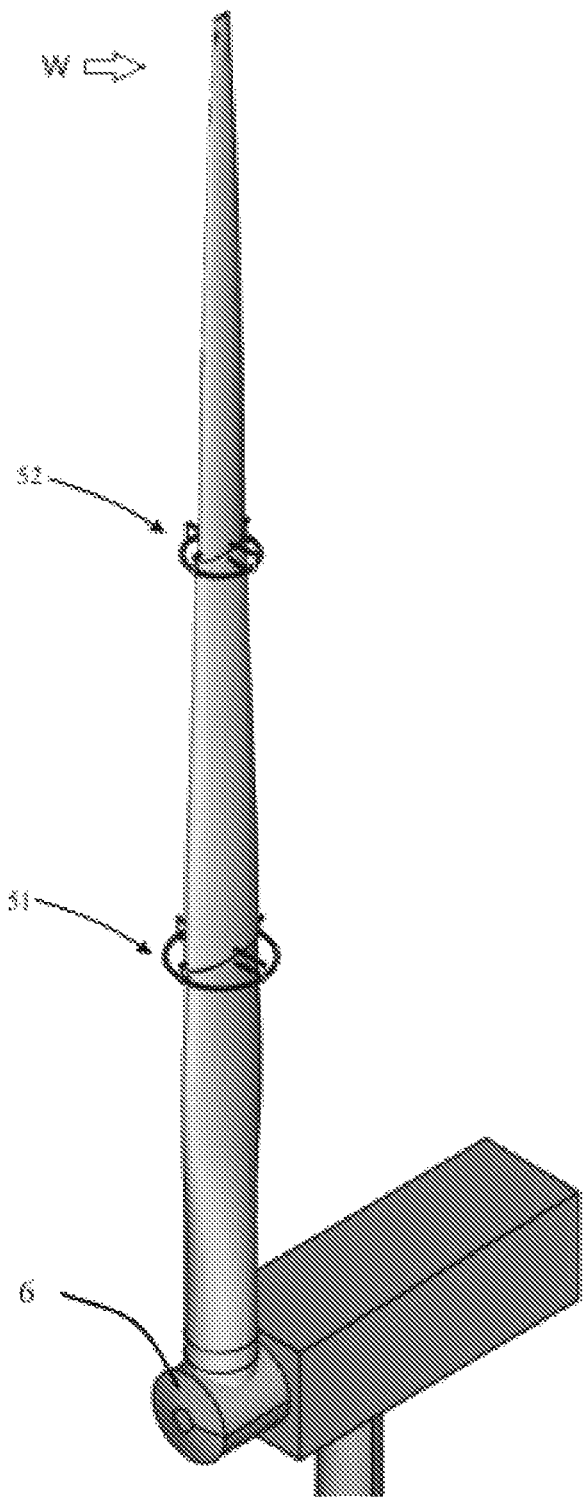
FIG. 6 presents the blade position of blade components in the embodiment of FIG. 3 under relatively higher wind speed.
Figure 7:
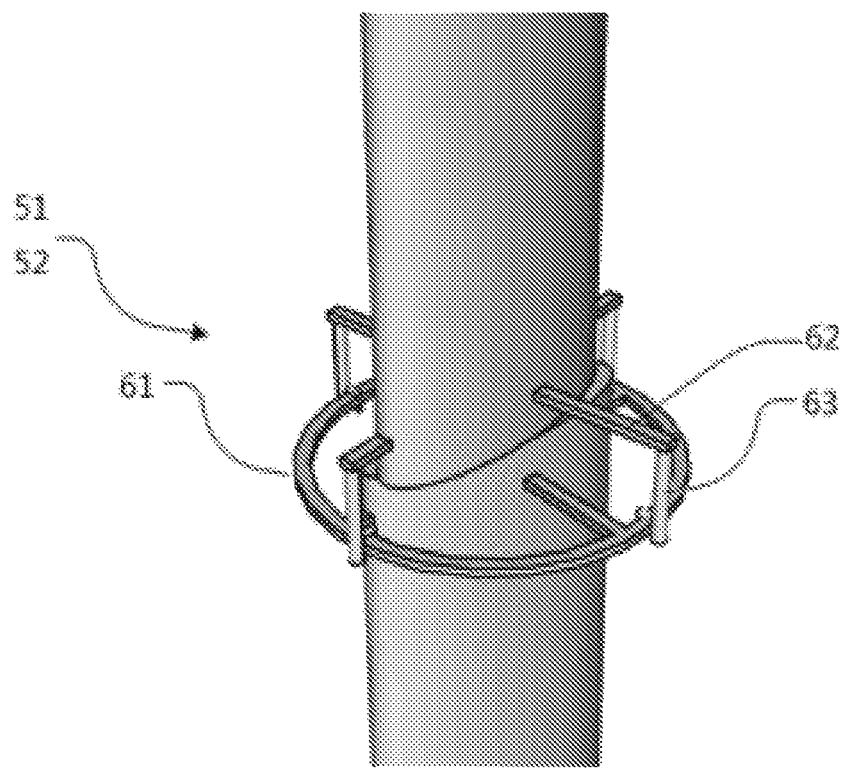
FIG. 7 is a partial enlarged drawing of blade component in FIG. 6 and presents the connection that connecting brackets between blade segments as well as feathering (90°) position of the two blade segments under variable pitch rotation.

FIG. 6 and FIG. 7 present that all the blade segments of the present invention are rotated at feathering position (pitch angle of 90°) under extreme wind conditions (the direction of arrow in FIG. 6 is the wind direction). In the exemplary embodiment of wind turbine with radius of 40 meters mentioned above, the blade component 10 according to the embodiment of the present invention may use the blade root variable-pitch actuating mechanism at the joint between hub and blade root to enable the variable-pitch rotation of all blades to rotate the blade root segment together with other blade segments for the positive pitch angle of about 74° under extreme wind conditions. There is the installation twist angle of about 16° in the middle blade segment, therefore the inclined angle between airfoil chord line of blade root segment 101 and rotation plane of wind rotor is in the feathering state of 90°. Then (or simultaneously) use the variable-pitch actuating mechanism at the joint between blade segment 101 and blade segment 102 to rotate the blade segment 102 for about 7° along the positive pitch angle direction relative to blade segment 101. Because there is the installation twist angle of about 9° in the middle blade segment, this makes the inclined angle between middle airfoil chord line of middle blade segment 102 and the rotation plane of wind rotor be in the feathering state of 90°. Then (or simultaneously) use the variable-pitch device between blade segment 102 and 103 to rotate the blade segment 103 for about 6° along positive pitch angle relative to blade segment 102. Because there is the installation angle of about 3° in the middle blade segment, so that the inclined angle between middle airfoil chord line of middle blade segment 103 and the rotation plane of wind rotor be in the feathering state of 90°. If there are more blade segments, use the same method to adjust the inclined angle between the airfoil chord line of the middle part of other blade segments and rotation plane of wind rotor into the feathering state of 90°. In this way, all the blades are basically in the feathering state.

Although the embodiment for controlling the blade pitch angle and related angles are described above by referring to specific blade with specific twist angle, it may be inferred that the above specific angles are not crucial; and adopt partially or completely different blade twist angles and/or control or select partially or completely different blade segment pitch angles in one or multiple other embodiments.

Based on FIG. 3 to FIG. 7, the present invention also provides a kind of blade component, the rotor with such blade component or the variable-pitch control method for wind turbine with such rotor. For example, conduct variable-pitch control to the blades through computer so as to guarantee the efficient and safe operation of wind turbine. The control method according to the embodiment of the present invention can guarantee the wind turbine blades to have good attack angle in start-up state, normal operation state and/or shut-down feathering state. When the wind turbine is shut down, the pitch angle is 90° (fully downwind); when the wind speed reaches start-up speed (cut-in wind speed), adjust the blade pitch angle to ensure all the blade sections of each blade segment to have the optimal attack angle so as to obtain relatively large start-up torque; when the rotor speed reaches certain speed (generally being rated wind speed), adjust the pitch angle of blade segment to 0°. In normal operation, when the power is below the rated power, the pitch angle is about 0°; when the power exceeds rated power, increase the attack angle of blade according to computer orders and continuously adjust the pitch angle of blade segment to ensure the output power of generator to be kept around rated power and keep the variation range of pitch angle from 0° to certain angle; when the wind speed is higher than cut-out wind speed, the wind turbine will not generate power and the pitch angle of each blade segment will be adjusted to the extent with minimum lift force; if forecasted as long-time exceeding the cut-out wind speed, start up the brake equipment to shut down the wind turbine and ensure all the blade segments to be in feathering state. Any or all the said measures may be optional according to demands.

From this, in the embodiment of the method for control on pitch angle of blade provided by the present invention, in principle, it involves the adjustable blade pitch angle segment control so as to obtain the optimal pitch angle control respectively aiming at each blade segment such as the optimal attack angle or feathering state mentioned above.

Figures 8, 8A:
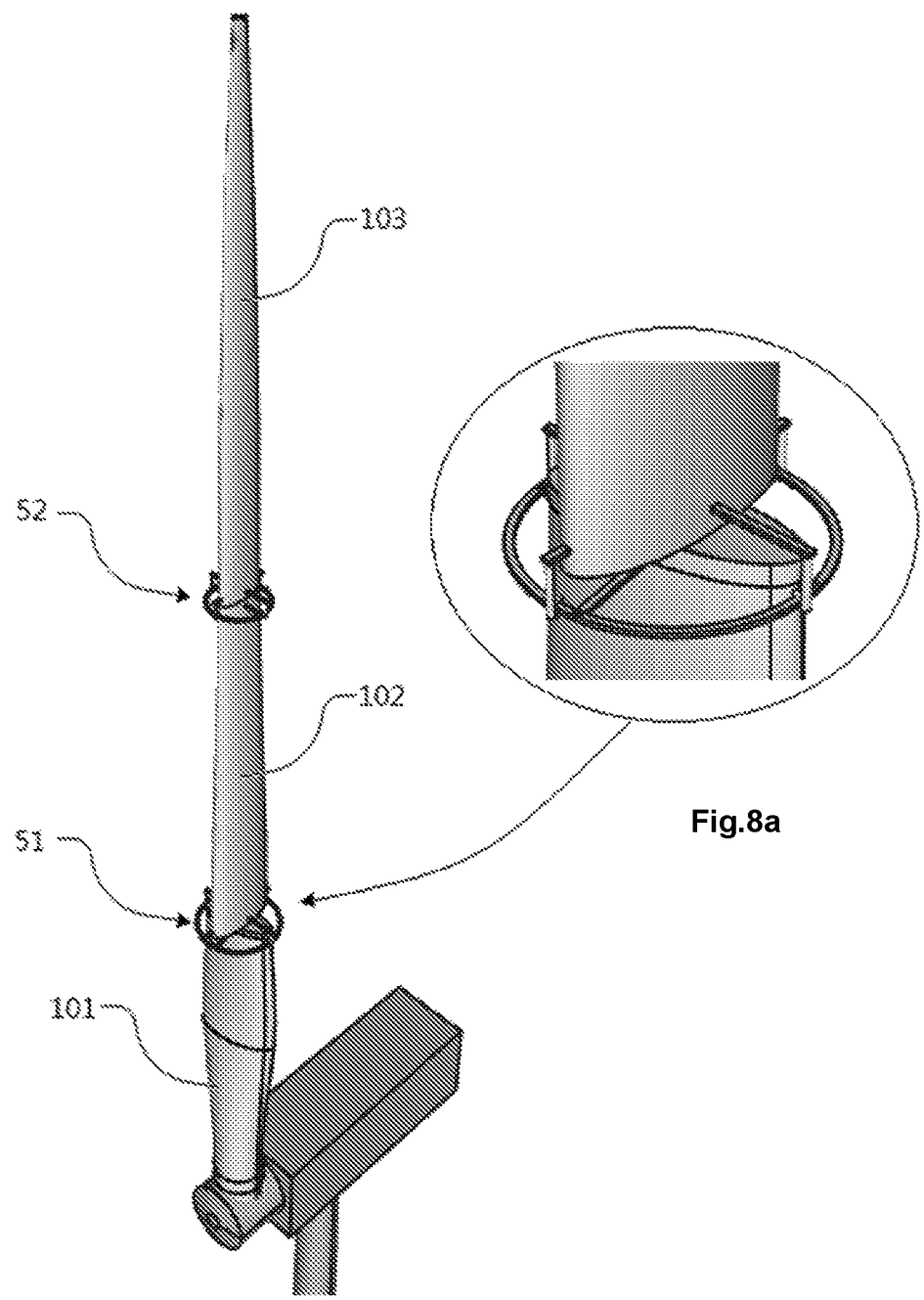
FIG. 8 presents the blade components of the embodiment in FIG. 3.
FIG. 8a presents a partial enlarged drawing of FIG. 8.

FIG. 8 presents the states of adjustment of blade segments for the blade component 1 of the present invention under relatively higher wind speed.

The use of wind turbine with blade component 1 in the embodiment of the present invention may improve the maximum annual power generation of wind power plant and optimize the output power quality of wind plant.

Figure 9:
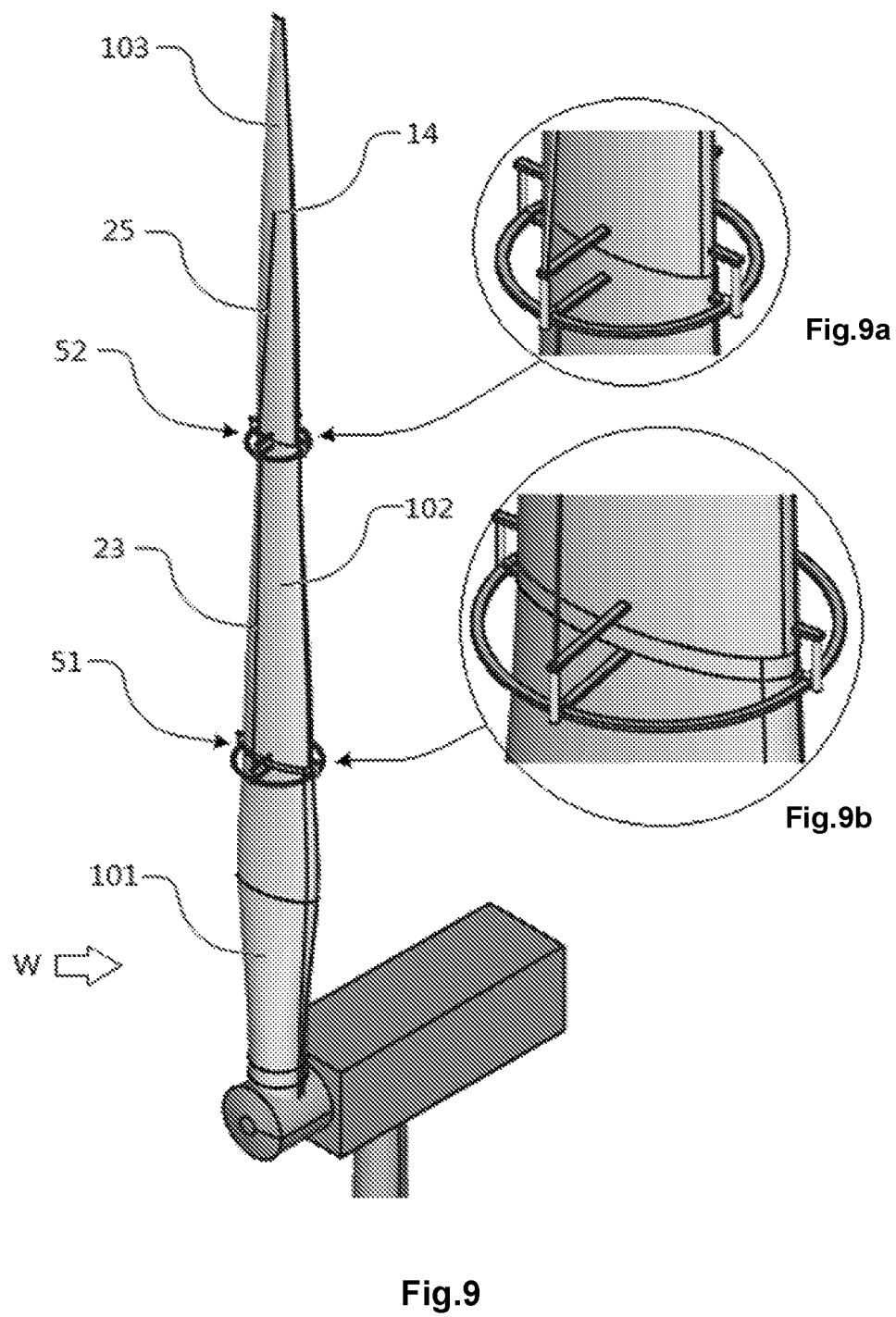
FIG. 9 presents a space diagram of blade component of another embodiment according to the present invention.

FIG. 9 presents another embodiment of the present invention, and FIG. 9a and FIG. 9b present the partial enlarged drawing of adjacent blade segment. In the embodiment shown in FIG. 9, on one side of blade, such as the windward side, the (first) blade reinforcing member 23 and 25 are added to each blade component 10. In the indicated embodiment, the blade reinforcing member 23 is connected with variable-pitch guiding structure 51 and variable-pitch guiding structure 52. The blade reinforcing member 25 is fixedly connected with variable-pitch guiding structure 52 on one end (lower end), while at suitable position of the middle-upper part on the other end (upper end), the connecting point 14 is directly connected with blade tip 103. Preferably, calculate suitable position of connecting point 14 according to the load of blade. For instance, the connecting point is approximately located in the middle part of blade tip segment along length wise direction. The said connecting point is to provide a supporting point for the blade segment 103, which can reduce the bending moment from the connecting point 14 of blade segment 103 to the blade at variable-pitch guiding structure 52, so as to reduce the thickness of main beam and shell of this blade segment. Relying on the variable-pitch guiding structure 51 and 52 of blade according to the present invention as well as the blade reinforcing member 23, the cross section of blade main beam is enlarged and the bending stiffness (EI) of blade segment 102 is increased.

Figure 10A:
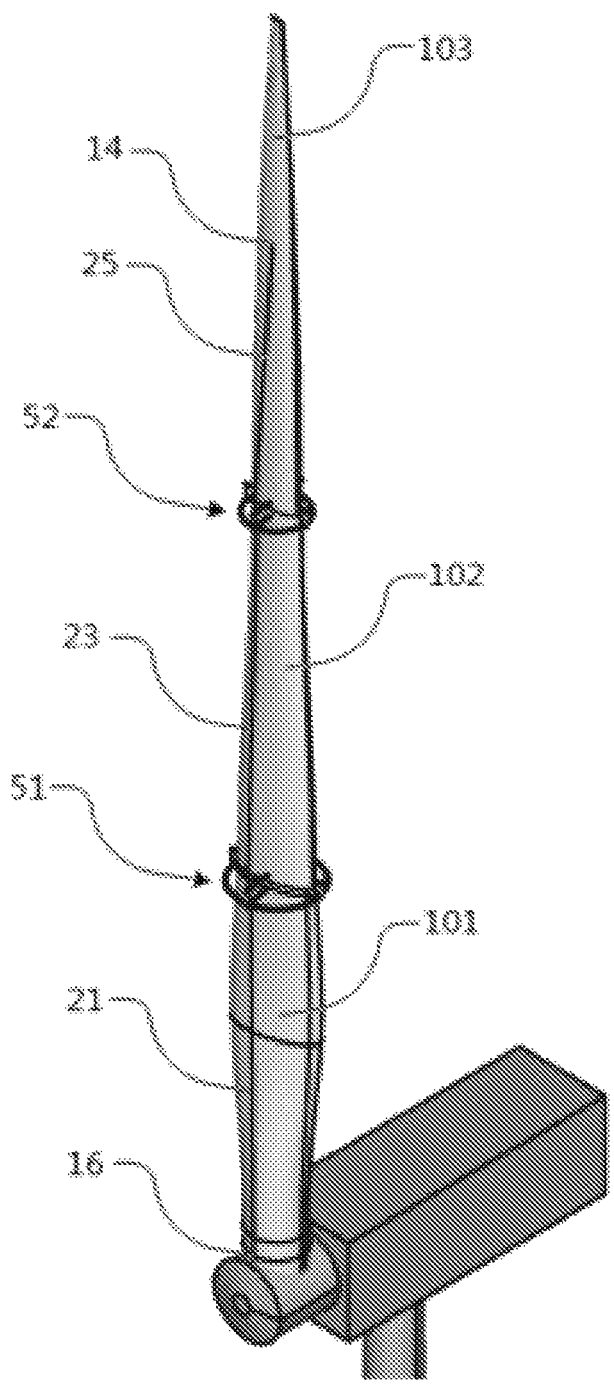
FIG. 10a and FIG. 10b present the space diagrams of blade component of another embodiment according to the present invention.
Figures 10B, 10C, 10D:
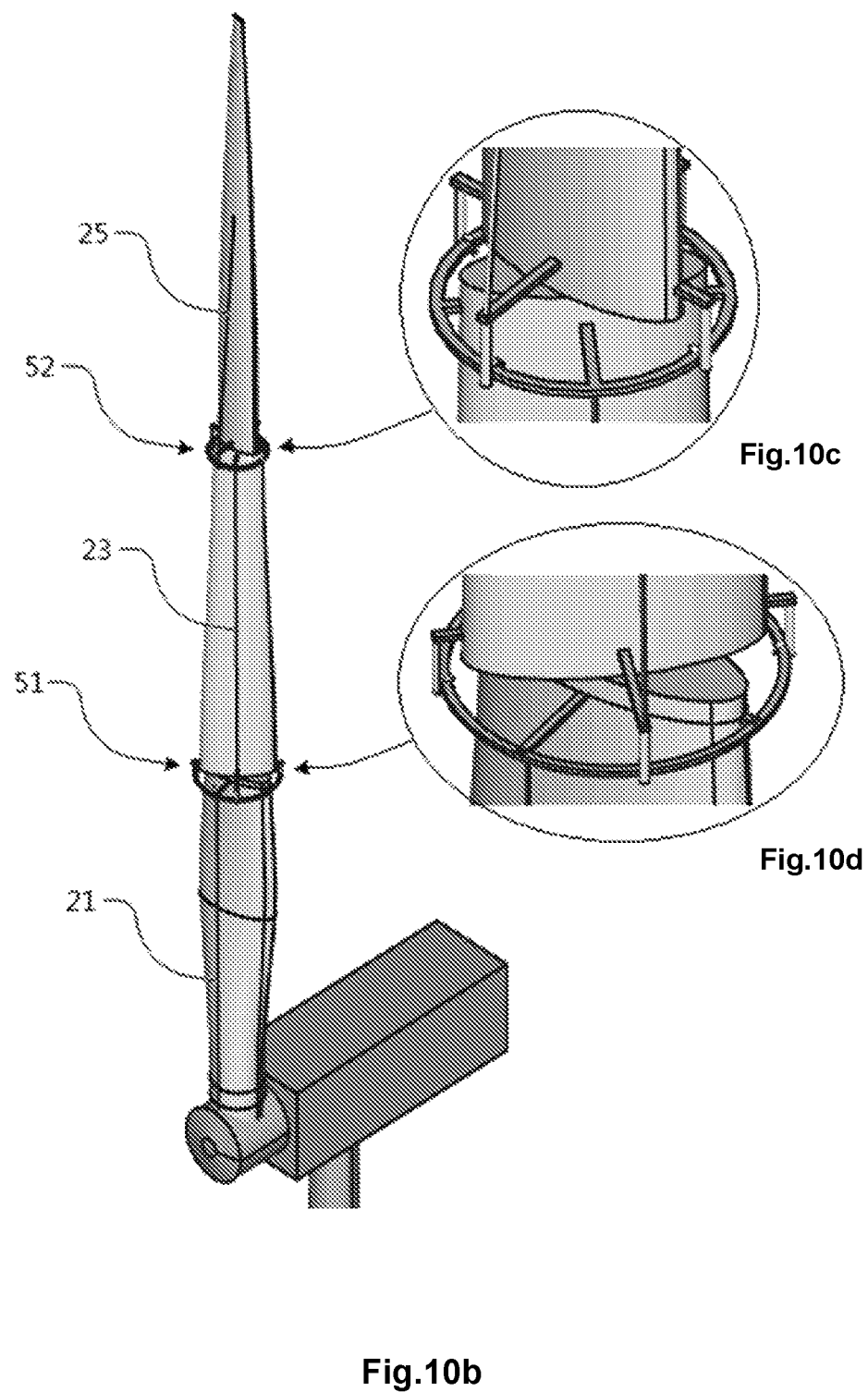
FIG. 10c and FIG. 10d present the partial enlarged drawings of FIG. 10b.

FIG. 10a and FIG. 10b indicate another embodiment according to the present invention and the FIG. 10c and FIG. 10d indicate the partial enlarged drawing of adjacent blade segment in FIG. 10b. In the embodiment indicated in FIG. 10a, each blade is equipped with blade reinforcing members 21, 23 and 25 on the windward side. The blade reinforcing member 21 is connected with the blade root segment 101 at the blade root on one end (lower end), and is connected with the variable-pitch guiding structure 51 on the other end (upper end). The blade reinforcing member 23 is connected with variable-pitch guiding structures 51 and 52; the blade reinforcing member 25 is fixedly connected with variable-pitch guiding structure 52 on one end (lower end), and connecting point 14 is directly connected with blade tip segment 103 on the other end (upper end) at suitable position of the middle-upper part. For example, the connecting point is approximately located in the middle position of blade tip segment along length wise direction, which can reduce the bending moment from connecting point 14 of blade segment to the blade at variable-pitch guiding structure 52 so as to reduce the thickness of main beam and shell of this blade segment. Relying on the variable-pitch guiding structure 51 and 52 of the present invention as well as blade reinforcing members 21 and 23, the cross section of blade main beam is enlarged and the bending stiffness (EI) is increased. FIG. 10b indicates the partial enlarged drawing of variable-pitch guiding structure for the blade of this embodiment and the connection between blade segment and blade variable-pitch guide structure, as well as the variable-pitch rotation of one blade segment relative to another blade segment.

Figures 11, 11A, 11B:
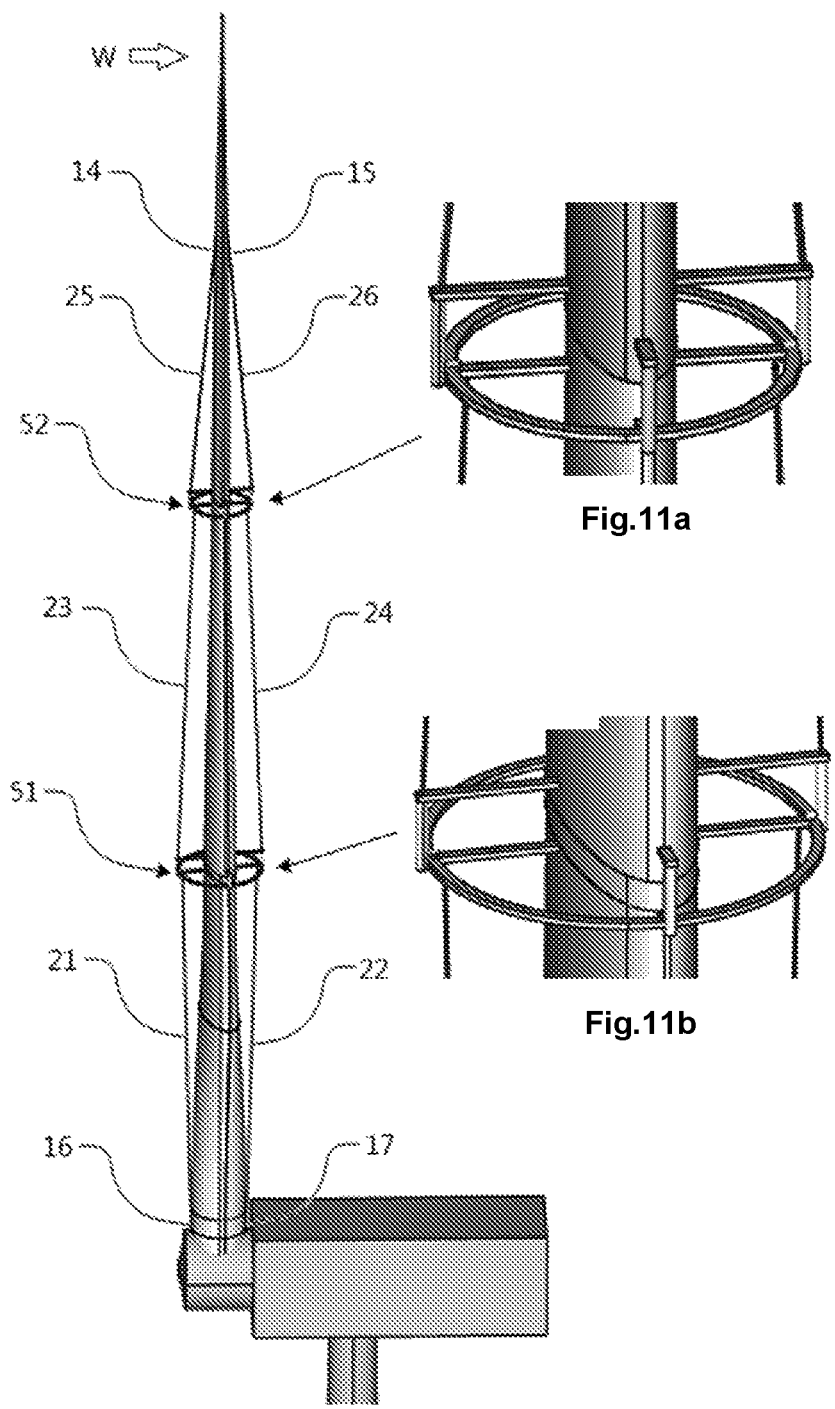
FIG. 11 presents a space diagram of blade component of another embodiment according to the present invention.
FIG. 11a and FIG. 11b present the partial enlarged drawings of FIG. 11.

FIG. 11 indicates another embodiment according to the present invention. FIG. 11a and FIG. 11b indicate the partial enlarged drawing of adjacent blade segments. In the embodiment indicated in FIG. 11, on the first side of each blade such as the windward side (the arrow direction of W in FIG. 11 is the wind direction), the (first) blade reinforcing members 21, 23 and 25 are equipped. In addition, on the reverse second side of blade, such as leeward side, the (second) blade reinforcing members 22, 24 and 26 are equipped. Blade reinforcing members 21 and 22 are connected with blade root segment 101 at the blade root on one end (lower end), and is connected with variable-pitch guiding structure 51 on the other end (upper end). Blade reinforcing members 23 and 24 are connected with variable-pitch guiding structures 51 and 52; the blade reinforcing members 25 and 26 are fixedly connected with variable-pitch guiding structure 52 on one end (lower end), and connecting point 14 and 15 are directly connected with blade tip segment 103 at suitable middle-upper position of the blade on the other end (upper end). For example, the connecting point is approximately located in the middle of blade tip segment 103 along length wise direction, which may reduce the bending moment from connecting point 14 of blade segment 103 to the blade of variable-pitch guide structure 52 so as to reduce the thickness of main beam and shell of this blade segment. Similarly, because of blade reinforcing member 26, in the case of mutational reverse wind, reverse bending moment from connecting point 15 of blade segment 103 to the variable-pitch guiding structure 52 may be reduced. Relying on the blade variable-pitch guiding structures 51 and 52 according to the present invention as well as the blade reinforcing members 21 and 23, the cross section of blade main beam is enlarged and the bending stiffness of blade is increased (EI). In addition, although not limited by theory, relying on the blade variable-pitch guiding structures 51 and 52 according to the present invention and the (first and second) blade reinforcing members 22 and 24 equipped on both sides of blade in this embodiment, the reverse bending moment stiffness (EI) of blade are also improved even in the case of mutational reverse wind. Especially, the capacity of responding to mutational reverse wind (blowing to the back of former blade) in the blade with multi-segment variable pitch according to the present invention is particularly beneficial.

Figure 12:
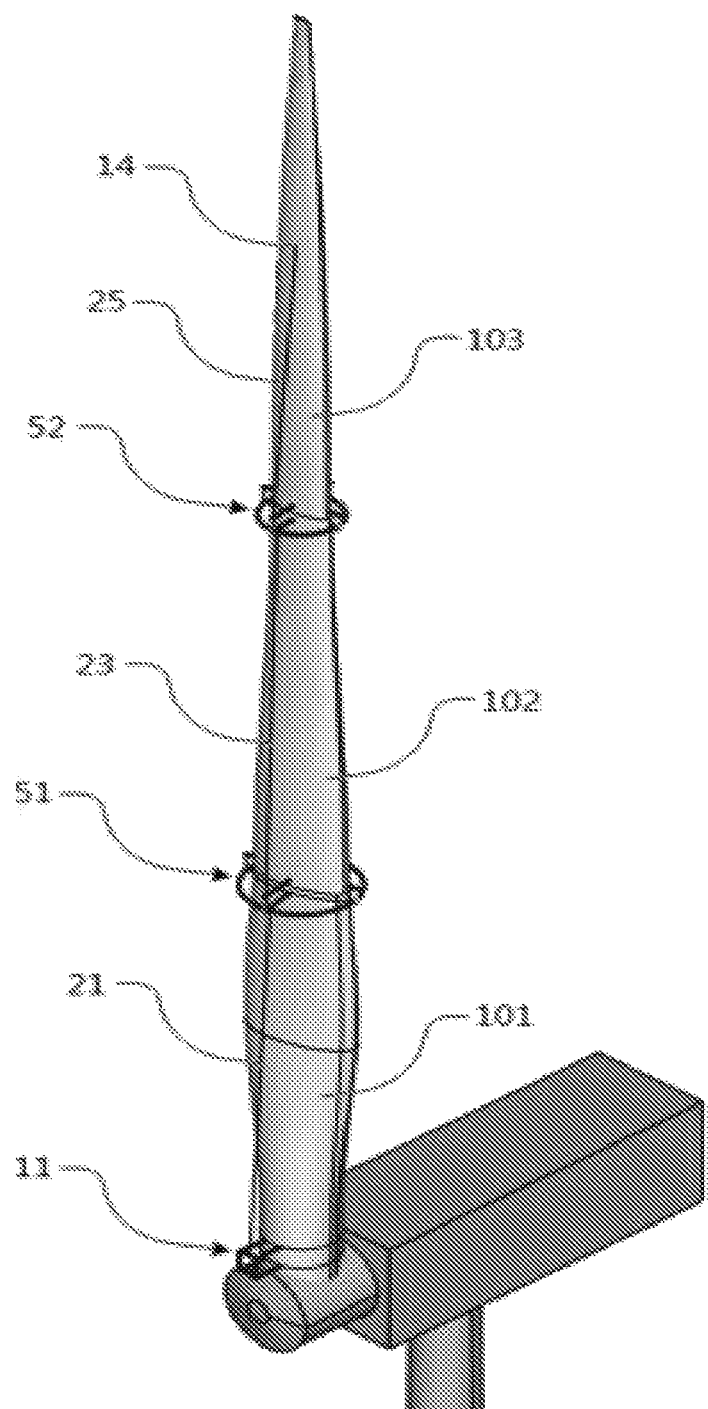
FIG. 12 presents the space diagram of blade component of another embodiment according to the present invention.

FIG. 12 indicates another embodiment according to the present invention. In the embodiment indicated in FIG. 12, on one side of each blade, e.g. the windward side, the (third) connecting bracket 11 and (first) blade reinforcing members 21, 23 and 25 are equipped. In the indicated embodiment, the connecting bracket 11 is equipped on the blade segment, e.g. blade root segment 101. In the indicated embodiment, the connecting bracket 11 possesses integrated rectangular frame and doesn't work as guide structure. The blade reinforcing member 21 is connected with connecting bracket 11 and variable-pitch guiding structure 51 which serves as first connecting bracket. The blade reinforcing member 23 is connected with the variable-pitch guiding structure 51 which acts as first connecting bracket and the variable-pitch guiding structure 52 which serves as second connecting bracket; the blade reinforcing member 25 is fixedly connected with the variable-pitch guiding structure 52 which acts as second connecting bracket on one end (lower end), and connecting point 14 is directly connected with blade 1 at suitable middle-upper position of the blade on the other end (upper end). Preferably, the position which is suitable for connecting point 14 is calculated according to load on the blade. For instance, the connecting point is approximately at the middle of blade tip segment 103 along length wise direction. The said connecting point is equivalent to provide a supporting point for blade segment 103, which may reduce the bending moment from connecting points 14 and 15 of blade segment 103 to the blade at variable-pitch guiding structure 52, so as to reduce the thickness of main beam and shell of this blade segment. Relying on the blade connecting brackets 11, 51 and 52 according to the present invention as well as the blade reinforcing members 21 and 23, the cross section of blade main beam is enlarged and the bending stiffness (EI) of blade is also increased.

Although not specifically indicated in FIG. 12, it may also be inferred that the (second) blade reinforcing members 22, 24 and 26 (not displayed) as shown in FIG. 11 are equipped on the reverse second side of blade (e.g. leeward side). The blade reinforcing member 22 is connected with blade root segment 101 at blade root on one end (lower end), e.g., direct connection or connection through the connecting brackets 11 similar with the (third) connecting bracket, and connected with the variable-pitch guiding structure 51 on the other end (upper end); the blade reinforcing member 24 is connected with variable-pitch guiding structures 51 and 52; the blade reinforcing member 26 is fixedly connected with variable-pitch guiding structure 52 on one end (lower end) and directly connected with blade tip segment 103 at suitable middle-upper position of the blade (e.g., connecting point 15) on the other end (upper end). For instance, the connecting point is approximately at middle of blade tip segment 103 along length wise direction. In this way, because of blade reinforcing member 26, the reverse bending moment from connecting point 15 of blade segment 103 to the blade at variable-pitch guiding structure 52 may also be reduced even in the case of mutational reverse wind. Similarly, relying on the blade variable-pitch guiding structures 51 and 52 according to the present invention as well as the blade reinforcing members 22 and 24, in the case of mutational reverse wind, the reverse bending moment stiffness (EI) of blade may also be improved.

In the embodiment indicated in FIG. 12, the connecting bracket 11 may comprise first leg, the second leg separated with first leg by longitudinal separation and the connecting rod with mutual fixed connection of said first leg and second leg or any suitable connecting members. Continue referring to FIG. 12, the connecting bracket may be the form of frame and the said preferential first leg and second leg may also be in the beam structure, for example, respectively comprises preferential parallel column element and beam element.

It may be inferred that, in other embodiments, the connecting bracket 11 may act as the supplement or replacement of other connecting bracket (variable-pitch guide structure) or its connecting function. It may also be inferred that the connecting bracket 11 is equipped with other blade segments, for example, the connecting bracket used for connecting the blade reinforcing members is equipped at connecting point 14 and/or 15.

Although the embodiment in FIG. 9 to FIG. 12 indicates that every blade reinforcing members are approximately aligned along length wise direction, and only one blade reinforcing member extended along blade longitudinal axis is connected with connecting bracket. However, other structures may also be come up with, such as more blade reinforcing members approximately aligned along length wise direction or more parallel blade reinforcing members. More preferably, the blade reinforcing members equipped on both sides along blade longitudinal axis may help improve the bending stiffness (EI) of blade in both flapwise and edgewise direction at the same time.

In the indicated preferential embodiment, the overall frame structure of connecting bracket (or variable-pitch guide structure) is helpful for reducing the aerodynamic impacts on blades, such as minimization of wind resistance. However, the technicians of this field will understand that the connecting bracket may be in other structures or shapes which will fall into the scope of the present invention. For example, the number or shape of leg, guide rail and/or connecting member may be different.

In a preferential embodiment, the blade reinforcing member may possess different cross section shapes, for instance, preferential circle may also be rectangle, square and oval, etc. More preferably, the blade reinforcing member may possess different cross section sizes along the longitudinal various blade segments. The cross section size of blade reinforcing member decreases progressively from blade root segment to blade tip, and the distance between blade reinforcing member and blade shell may also be adjusted correspondingly. The external cross section of blade reinforcing member may also possess different shapes like circle and oval, etc. More preferably, the external cross section of blade reinforcing member should select more aerodynamic shapes, so as to reduce the wind resistance and noise. Especially preferable, select the external airfoil shape to generate lift force, thus to help the rotation of rotor blade.

In a preferential embodiment, at least one of or preferably all of the blade reinforcing members are the tensile reinforcing members. The tensile reinforcing members with high strength, flexible tensile reinforcing members and rope are preferential. Preferably, at least one of or preferably all of the blade reinforcing members are ropes made of reinforced fiber composite, and the carbon fiber ropes are even more preferential. However, it may be inferred that the blade reinforcing members may comprise other types of ropes like those made of the same materials as the blade (e.g., glass fiber ropes).

In a preferential embodiment, the tension prestress may be exerted on blade reinforcing members 21, 23 and 25 so that the leeward of blade main beam will bear the tensile stress first. During running of the wind turbine blade, the prestretching stress may partially cancel out the pressure stress incurred by loads so as to improve bearing capacity of the blade.

Continue referring to FIG. 2-FIG. 13a and FIG. 13b, the manufacturing method of segment-based reinforcing blade in the embodiment according to the present invention is elaborated. In an exemplary embodiment in the present invention, blade segment 101, 102 and 103 are manufactured in segments and may be assembled on site. Optionally, the variable-pitch actuating mechanism (if any) equipped in blade segment as shown in FIG. 13a and FIG. 13b may be equipped during or after manufacturing the blade segments.

Preferably, the blade reinforcing members 21-26 may be connected with connecting bracket (leg) when manufacturing the blade segments and/or blade (blade segment). In the alternative embodiment, the blade reinforcing members 21-26 may be assembled on site, for instance, installation may be made after formation of connecting bracket (or variable-pitch guiding structure).

However, the technicians of this field may infer that the connecting bracket may integrally form with blades or blade main beam, beam web or shell, or that the connecting bracket may wholly be fixedly connected to the blade or blade main beam, beam web or shell. Optionally, the connecting bracket (or variable-pitch guiding structure) may have multiple first legs, as is shown in the indicated embodiment, so that the combination of this first leg and circumferential guide rail may provide the improved bending stiffness like beam because it spans a certain distance crosswise.

Preferably, the connecting bracket (or variable-pitch guiding structure) may be formed partially or completely by the same materials with the blade, or blade main beam, beam web or shell, such as glass fiber composite, or the integration of materials more preferably. However, the technicians of this field will infer that the connecting bracket may also be formed adopting different materials.

It shall be understood that although this instruction makes descriptions according to each embodiment, not every embodiment only comprises an independent technical scheme. The statement mode of instruction is only for clarification and the technicians of the field shall deem the instruction as integrity. The technical schemes of each embodiment may be suitably combined to form the other enforcement measures that is easy to understand for the technicians of this field. The innovative characteristics disclosed in the instruction are not essential. And each innovative characteristic may combine with other existing configurations so as to obtain a new technical scheme which all falls into the scope of the present invention.

The all of above are only the schematic specific mode of execution of the present invention, which is not used to limit the scope of the present invention. Any equivalent variation, alterations, modification or combination made by any involved technician without departing from the conception and principle of the present invention shall be under the protection of the present invention.

REFERENCE SIGNS LIST

1—Rotor
2—Blade shell
3—Beam structure
4—Main beam
5—Shear web
6—Hub
10—Blade component
11—Connecting bracket
14—Connecting point
15—Conencting point
16—Variable-pitch actuating mechanism
21—Blade reinforcing member
22—Blade reinforcing member
23—Blade reinforcing member
24—Blade reinforcing member
25—Blade reinforcing member
26—Blade reinforcing member
31 First leg
32 Second leg
33 Connecting rod
51—Variable-pitch guiding structure (connecting bracket)
52—Variable-pitch guiding structure (connecting bracket)
61—First supporting part
62—Second supporting part
63—Connecting part
100—Blade
101—Blade segment and blade root segment
102—Blade segment and middle blade segment
103—Blade segment and blade tip segment
161—Variable-pitch drive motor
162—Variable-pitch bearing
611—First leg
612—Guide rail
621—Second leg
631—Connecting element
632—Guiding element
311—column element
312—Column element
313—Beam element
321—Column element
322—Column element
323—Beam element

What is claimed is:

1. A variable-pitch multi-segment blade component comprising:
   a plurality of blade segments, at least two adjacent blade segments of said plurality of blade segments configured to be rotated about a pitch axis of said blade segments; and
   at least one variable-pitch guiding structure, said at least one variable-pitch guiding structure configured to be placed outside of the blade segments and connected to the at least two adjacent blade segments, wherein said variable-pitch guiding structure comprises a guide rail fixed to one of the at least two adjacent blade segments and a plurality of guiding elements fixed to another one of the at least two adjacent blade segments, wherein said guide rail is placed at a distance from an external surface of the blade segments, and wherein said guiding elements are constructed to be guided and moved on said guide rail.

2. The variable-pitch multi-segment blade component according to claim 1, wherein said blade segments comprise at least one variable-pitch actuating mechanism at an interface between the at least two adjacent blade segments.

3. The variable-pitch multi-segment blade component according to claim 2, wherein said variable-pitch actuating mechanism comprises a variable-pitch driver and a variable-pitch bearing equipped inside the blade segments.

4. The variable-pitch multi-segment blade component according to claim 1, wherein said variable-pitch guiding structure comprises the guiding elements equipped with circumferential interval.

5. The variable-pitch multi-segment blade component according to claim 1, wherein said guiding elements comprise a plurality of rolling elements rolling along said guide rail and/or a plurality of sliding elements sliding along said guide rail.

6. The variable-pitch multi-segment blade component according to claim 5, wherein said guiding elements comprise a pair of rolling elements respectively rolling along a top surface and a bottom surface of said guide rail.

7. The variable-pitch multi-segment blade component according to claim 5, wherein said rolling elements comprise a plurality of rolling bearings.

8. The variable-pitch multi-segment blade component according to claim 1, wherein said variable-pitch guiding structure also comprises a first leg used for fixedly connecting the guide rail to one of the at least two adjacent blade segments and a second leg used for fixing the said guiding element to another one of the at least two adjacent blade segments.

9. The variable-pitch multi-segment blade component according to claim 8, wherein said variable-pitch guiding structure also comprises a plurality of connecting elements spanning a certain distance along the blade component in a length wise direction, where a first end of said connecting element is fixed to the second leg and a second end of said connecting element is equipped with said guiding element.

10. The variable-pitch multi-segment blade component according to claim 1, wherein said guide rail is a circular ring surrounding said blade segments.

11. The variable-pitch multi-segment blade component according to claim 1, wherein said blade component comprises at least one blade reinforcing member, wherein said blade reinforcing member is placed outside of the blade segments and connected to said variable-pitch guiding structure.

12. The variable-pitch multi-segment blade component according to claim 1, wherein said blade component comprises at least one blade reinforcing member equipped on one side of the blade segments, and at least one blade reinforcing member equipped on a reverse side of the blade segments, wherein said blade reinforcing members are connected to said variable-pitch guiding structure.

13. The variable-pitch multi-segment blade component according to claim 12, wherein said blade reinforcing members on both sides of the blade segments are symmetrically set around the blade segments.

14. The variable-pitch multi-segment blade component according to claim 2, wherein said variable-pitch actuating mechanism is equipped at an exterior of the blade segments.

15. A variable-pitch blade component comprising:
a plurality of blade segments, at least two adjacent blade segments of said plurality of blade segments configured to be rotated about a pitch axis; and
a plurality of connecting brackets configured to be place outside of the blade segments and fixed to the at least two adjacent blade segments;
wherein at least one of said connecting brackets is constructed to be used as a variable-pitch guiding structure fixed to the at least two adjacent blade segments capable to be rotated about a pitch axis;
wherein said variable-pitch guiding structure comprises at least one first leg fixed to one of said at least two adjacent blade segments, at least one of the second leg fixed to another one of the at least two adjacent blade segments, a guide rail fixed to said first leg, and at least one connecting element, wherein one end of said connecting element is fixed to the second leg and another end is equipped with a plurality of rolling elements.

16. The variable-pitch blade component according to claim 15, wherein said blade component comprises at least one blade reinforcing member, wherein at least one end of said blade reinforcing member is connected to said at least one connecting bracket.

17. A rotor, comprising a hub and the variable-pitch multi-segment blade component according to claim 1, wherein said blade component comprises a blade root segment.

18. A wind turbine, comprising said rotor according to claim 17.

19. A power generating equipment, comprising said rotor according to claim 17, said power generating equipment includes a wind turbine, ocean current turbine or tidal turbine.

* * * * *